Oct. 27, 1970   F. N. LUTZ ET AL   3,536,972
SAMPLE AND HOLD VOLTAGE CIRCUIT FOR CONTROLLING
VARIABLY ENERGIZED LOAD
Filed Dec. 9, 1968

INVENTORS
FRITZ NORMAN LUTZ
CHARLES A. WALL
BY
Yount, Flynn & Tarolli
ATTORNEYS

United States Patent Office 3,536,972
Patented Oct. 27, 1970

3,536,972
SAMPLE AND HOLD VOLTAGE CIRCUIT FOR CONTROLLING VARIABLY ENERGIZED LOAD
Fritz Norman Lutz and Charles A. Wall, Northfield, Ohio, assignors to The Warner & Swasey Company, Cleveland, Ohio, a corporation of Ohio
Filed Dec. 9, 1968, Ser. No. 782,110
Int. Cl. H02p 5/16
U.S. Cl. 318—331                    19 Claims

ABSTRACT OF THE DISCLOSURE

A circuit for sampling the counter electromotive force (CEMF) of a servomotor in a phase controlled servo system during intervals of non-energization of the servomotor. A capacitor is charged with a voltage proportional to the sampled CEMF when the armature current is below a predetermined value. This voltage is used during the next interval of energization of the servomotor to provide a velocity feedback signal.

---

This invention relates to a voltage sampling arrangement and to a motor control system embodying such a voltage sampling arrangement for sensing the counter electromotive force or armature voltage of a motor, preferably to provide a velocity feedback signal for controlling the energization of the motor.

The use of rate or velocity feedback signal to control the velocity of a servomotor or to improve the response of a positional servomotor is well known.

In a continuously driven system, the velocity feedback signal is provided by a tachometer generator or by an auxiliary winding in the servomotor, as shown in U.S. Pat. No. 2,993,160 to Soredal.

In a phase controlled or pulse width modulated system, in which the load is energized with direct current pulses of controlled duration and polarity, the velocity feedback signal may be provided by sampling the counter electromotive force (CEMF) of the servomotor during the intervals when it is not being supplied with input energy or, in other words, when the servomotor is coasting. Because the velocity feedback signal is needed during the succeeding interval when input energy is being supplied to the servomotor, there must be included some means for storing the sampled CEMF or a signal proportional to the sampled CEMF. One method of storing the sampled CEMF is to charge a capacitor to a voltage equal to or proportional to the CEMF, which voltage is then available to provide the velocity feedback signal during the succeeding interval when input energy is being supplied to the servomotor.

In prior art systems of the phase controlled or pulse width modulated type, the CEMF sampling interval is controlled by the same frequency source that controls the input energy pulses to the motor. Thus, in phase controlled systems the line frequency has been used and in pulse width modulated systems the pulse width modulator has been used to control the CEMF sampling interval. These systems may fail to operate properly if the motor current considerably lags the applied voltage, or if there is phase shift in the forward loop, without the use of compensation schemes. With current lag and large CEMF it is likely that the power gate, which may be a thyratron or an SCR, will deliver input current to the motor for some time after the nominal end of the driving interval. This is because the lag and CEMF may cause the voltage across the power gate to lag behind the applied voltage, so that the voltage across the power gate does not fall below its hold value until some time after the reference voltage has gone through zero. A CEMF voltage sample taken during, or partially during, the time when current is being supplied to the motor would not be representative of motor speed, but would also include components due to the driving input current and the armature IZ drop.

In addition, none of the prior art systems can be used with a polyphase phase controlled drive system in which the input voltages of different phases are in overlapping time relation so that driving current tends to flow from the next phase before driving current from the last phase falls to zero, thereby tending to maintain the driving current to the motor at some value other than zero. Because CEMF must be sampled when driving current is zero, the prior art systems are incapable of obtaining a valid CEMF sample in polyphase systems.

The voltage sampling arrangement of the present invention solves each of the problems presented above, and additionally provides a circuit that may be universally used on any pulse width modulated drive system or on any phase controlled drive system, either unidirectional or bidirectional, and whether it be single phase half wave or polyphase full wave.

The present invention provides a circuit arrangement for sampling and holding the CEMF, or a quantity proportional to the CEMF, of the load of a pulse width modulated or phase controlled drive system. The sampled value is then available during a subsequent driving interval for feedback control, or for metering. Although the circuit arrangement of the present invention may be used with any CEMF producing load, such as a storage battery being charged, the present description will be directed to its application to a phase controlled positional or rate servo system since this is the presently-preferred embodiment of this invention.

In the preferred embodiment, the present invention includes a motor current detecting means having an impedance in the armature circuit for providing a voltage when armature current is present. This voltage is then used to control a gating device, such as a field effect transistor (FET), to connect a storage capacitor to the armature when the armature current is below a predetermined value, so that the capacitor will then store a voltage proportional to the CEMF for use during a subsequent driving interval. The gating device disconnects the capacitor from the motor during the next driving interval, when the armature current is above the predetermined value, and the capacitor discharge is so slow that the stored voltage on the capacitor provides the desired velocity feedback signal during the driving interval. Where the system has a polyphase power supply, a time delay portion of the circuit provides a control signal to the power gates to provide an interval during which armature current is below the predetermined value for a sufficient time to enable a reliable sample to be taken.

It is, therefore, a principal object of the present invention to provide an improved circuit arrangement for sampling the voltage across a load which is variably energized by current.

It is another object of the present invention to provide a sample and hold voltage sensing circuit for a motor control system.

Another object of this invention is to provide such a circuit for a phase controlled system which may be either single phase or polyphase.

It is still another object of the present invention to provide a CEMF sample and hold circuit that may be used with any phase controlled or pulse width modulated drive system to provide a signal proportional to the CEMF of a CEMF-producing load.

These and other objects and advantages of the present invention will become apparent from the following detailed description of a presently-preferred embodiment with reference to the accompanying drawing and appended claims.

Figure 1:
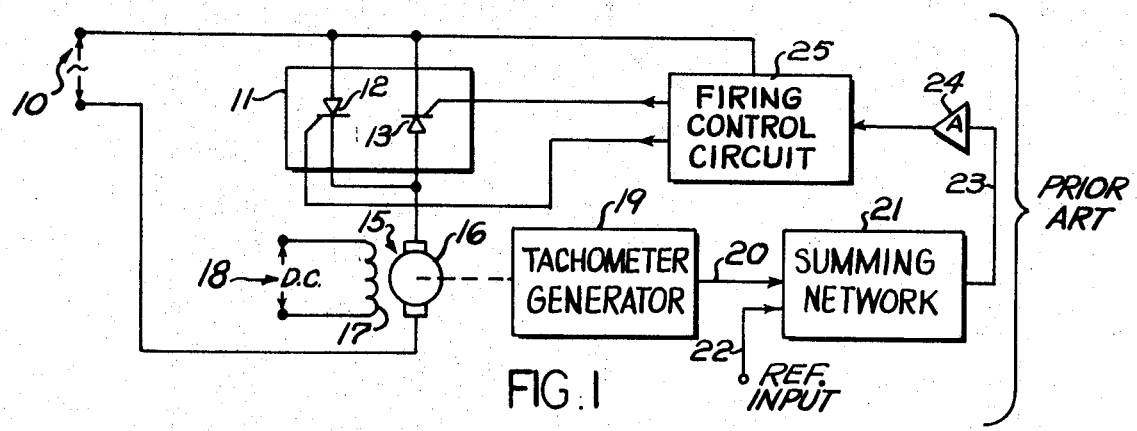
FIG. 1 is a schematic diagram representative of a typical prior art, single-phase, half-wave, bidirectional, phase-controlled servo system.

FIG. 1 is representative of one class of phase controlled servo system that is known in the art. It includes an AC power source 10, an SCR power gate circuit 11 comprising a pair of SCR's 12 and 13 connected in parallel with opposite polarities, and a DC shunt field motor 15. The parallel combination of SCR's 12 and 13 is connected in series with the armature 16 of the DC motor 15 across the AC power source 10. The shunt field winding 17 of motor 15 may be supplied from a separate DC source 18.

A tachometer generator 19 is mechanically coupled to the shaft of motor 15 and it provides on a line 20 a DC signal that is proportional in magnitude to the speed of the shaft of motor 15 and with a polarity determined by the direction of rotation of the motor shaft. This velocity or rate feedback signal on line 20 is summed in a summing network or device 21 with a reference input signal provided on line 22 to produce an error signal on an output line 23 from the summing network. This error signal, which may be amplified by an amplifier 24, is delivered to an SCR firing control circuit 25, which in turn controls the firing angles of SCR's 12 and 13. The operation of the servo system of FIG. 1 is well known in the art and need not be described in further detail.

In the prior art phase controlled servo system of FIG. 1, because the CEMF of the motor 15 in a practical system can never exceed the peak value of the AC power source 10, there will always be at least a brief interval of time during each cycle of the power source when the armature current of the motor is zero. During this interval when no armature current is flowing, the voltage across the armature is solely a function of the CEMF, which is directly proportional to the motor speed and of a polarity dependent on the direction of rotation. In other words, when no armature current is flowing, the voltage across the armature terminals is of the same character as a tachometer signal. Thus, by sampling the armature voltage when armature current is zero and storing the sampled voltage in a capacitor, a velocity or rate feedback signal can be made available during the next interval of current flow to provide, with the reference input signal, an error signal to control the firing of the SCR's.

This system has several advantages over systems using tachometers. Obviously, the tachometer itself is dispensed with and, therefore, so too is the coupling between the servomotor shaft and the tachometer. The servomotor will generally have more commutator bars than a tachometer generator that would be used with it and, therefore, for any given speed it will produce a smoother (less ripple) signal. Also, aside from any wiring required for the motor field, which may be a permanent magnet field, only two wires need be run from the control equipment to the motor, and no separate wires are required for a tachometer.

Prior art systems have used the sampling and storing of the motor CEMF to provide rate feedback in pulse width modulated and phase controlled systems. However, the sampling interval in the prior art systems is controlled by the pulse width modulator or source voltage, depending on the type of system. With large errors or large CEMF opposite in polarity to the instantaneous value of the source voltage, or if there is a current lag through the motor, it is possible that substantial armature current may be flowing during a sampling interval in such prior systems.

One of the salient features of the present invention is to provide an armature current detecting circuit which connects a voltage sampling circuit to the armature only when little or no armature current is flowing, and which effectively disconnects the voltage sampling circuit from the armature when substantial armature current is present. In this manner, no voltage sample can be taken when armature current is flowing, or stated conversely, the entire voltage sample interval is restricted to a time when armature current is substantially zero.

Figure 2:
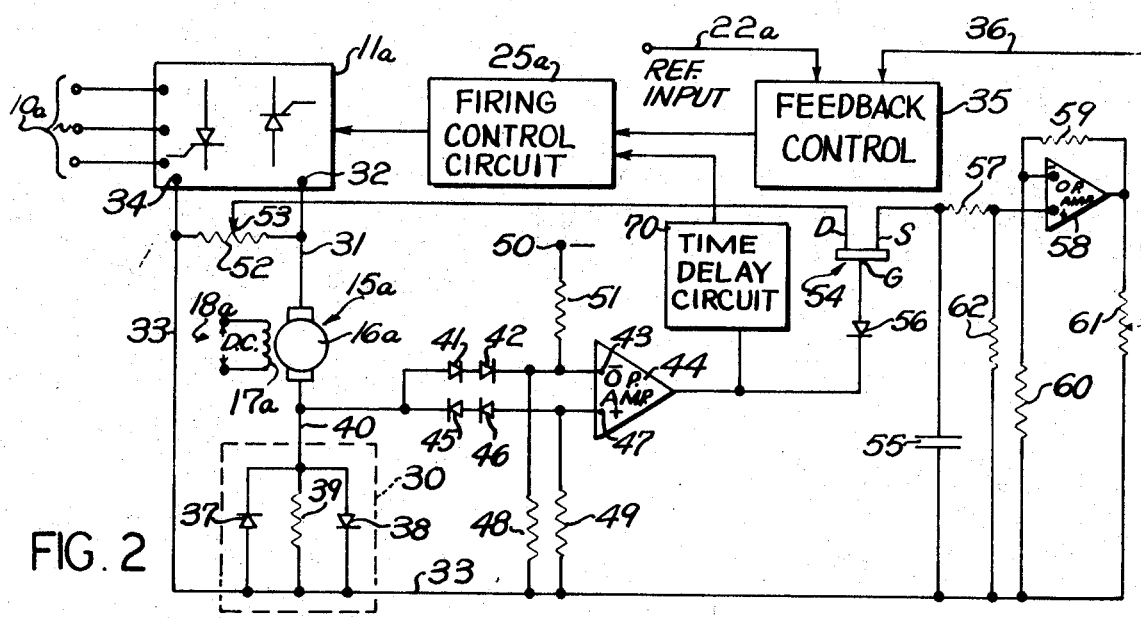
FIG. 2 is a schematic diagram of a servo system embodying the sample and hold CEMF circuit of the present invention.

FIG. 2 shows a generalized diagram of a phase controlled servo system including the sample and hold circuit of the present invention. Elements of the FIG. 2 system which correspond to elements of the FIG. 1 system are given the same reference numerals with an $a$ suffix added. These include in FIG. 2 the AC power source 10$a$, which may be either single-phase or polyphase, an SCR power gate circuit represented by the box 11$a$, and a DC shunt motor 15$a$ having an armature 16$a$ and a shunt field 17$a$. A load series impedance, indicated generally by the dashed-line box 30, is connected in series with the SCR circuit 11$a$ and the motor armature 16$a$ across the power supply. The SCR's in power gate circuit 11$a$ may be connected in any of the well-known ways to provide DC, or pulsating DC, current to the series combination of the armature 16$a$ and the load series impedance 30. A line 31 connects the upper end of the armature 16$a$ in FIG. 2 to one output terminal 32 of the SCR circuit 11$a$. Another line 33 connects the lower end of the load series impedance 30 in FIG. 2 to the opposite output terminal 34 of the SCR circuit 11$a$.

The SCR's in power gate circuit 11$a$ are fired selectively by an SCR firing control circuit, represented by the box 25$a$. The firing control circuit 25$a$ may include any of the various known arrangements for firing SCR's, such as direct triggering or pulse triggering, with or without pulse transformers. The SCR firing circuit 25$a$ is controlled by a feedback control circuit 35, which may have one or more loops, such as a position loop, a rate or velocity loop, or an acceleration loop. The feedback control circuit 35 has a reference input on line 22$a$ and a velocity or rate feedback input on line 36 in the embodiment shown in FIG. 2.

The load series impedance 30 comprises a parallel combination of two diodes 37 and 38 and a resistor 39. The diodes are connected with opposite polarity so that when current flows through the armature in either direction, one of the diodes will be reverse biased and the other will be forward biased. The forward biased diode limits the voltage drop across the impedance 30. Preferably, diodes 37 and 38 are silicon diodes with a forward voltage drop of approximately 0.6 volt.

As is well known, below a certain forward voltage (threshold voltage) which is dependent upon the materials used to form the diode junction, a diode acts substantially as an open circuit. Above the threshold voltage, the diode will, within its current carrying capacity, tend to conduct sufficient current to substantially prevent the voltage drop across the diode from further increasing above the threshold voltage.

Figure 3:
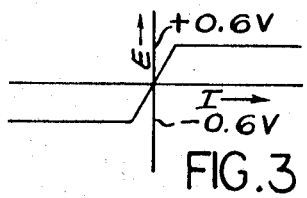
FIG. 3 is a plot of voltage across the load series impedance versus the armature current in the FIG. 2 system.

In the circuit of FIG. 2, when the voltage at the line 40 between the motor armature 16$a$ and the upper end of the load series impedance 30 is between +0.6 volt and −0.6 volt with respect to line 33, diodes 37 and 38 act as open circuits, all the armature current flowing through resistor 39. Of course, when the armature current increases to tend to cause a voltage greater than 0.6 volt across resistor 39, one of the diodes 37 and 38 will conduct and limit the voltage across the load series impedance 30 to substantially 0.6 volt. The voltage E across impedance 30 plotted against armature current I is shown in FIG. 3.

The line 40 between the motor armature 16a and the load series impedance 30 is connected through a pair of series-connected germanium diodes 41, 42 of the same polarity to the inverting input terminal 43 of an operational amplifier 44. Diodes 41, 42 are of a polarity to pass positive current to the amplifier input terminal 43. Each of the diodes 41, 42 has a forward voltage of about 0.2 volt, so that the complete voltage drop across them is limited to about 0.4 volt.

The line 40 also is connected through a pair of series-connected germanium diodes 45, 46 of the opposite polarity to the non-inverting input terminal 47 of the operational amplifier 44. Diodes 45, 46 pass negative current to the amplifier terminal 47. Each of the diodes 45, 46 has a forward voltage of about 0.2 volt, so that the complete voltage drop across them is limited to about 0.4 volt.

The operational amplifier 44 has appropriate resistors 48 and 49 connected between its inverting input terminal 43 and its non-inverting input terminal 47, respectively, and line 33.

A negative bias source 50 for the operational amplifier is connected through a resistor 51 to the inverting input terminal 43.

A voltage divider 52, which may be two or more fixed resistances, has its end terminals connected to lines 31 and 33, respectively, and its intermediate terminal 53 connected to the drain electrode D of a field effect transistor (FET) 54, whose source electrode is connected to one terminal of a capacitor 55. The opposite terminal of capacitor 55 is connected to line 33. The gate electrode of FET 54 is connected to the output of the operational amplifier 44 through a diode 56 which is of a polarity to pass negative current from the output of the operational amplifier to the gate electrode.

Capacitor 55 acts as an energy storage means for storing the voltage which is sampled when the motor armature 16a is conducting substantially no current. FET 54 acts as a semiconductor switch which either connects capacitor 55 to the intermediate terminal 53 of voltage divider 52 or disconnects it from this terminal, depending upon whether FET 54 is conductive or non-conductive. The RC time constant of the charging circuit for capacitor 55 is very short so that capacitor 55 quickly is charged to a voltage proportional to the voltage across the motor armature 16a whenever FET 54 acts as a closed switch.

The upper terminal of capacitor 55 is connected through a resistor 57 to the non-inverting input terminal of an operational amplifier 58. A feedback resistor 59 is connected between the output of this amplifier and its inverting input terminal, and a resistor 60 is connected between this inverting input terminal and line 33. A resistor 62 is connected between the non-inverting input terminal of amplifier 58 and line 33. Resistors 57 and 62 and the input impedance of amplifier 58 provide a high impedance, long time delay discharge circuit for capacitor 55, so that the charge on capacitor 55 can leak off only at a very slow rate during each interval when FET 54 is non-conductive.

The feedback input line 36 for the feedback control 35 is connected to an adjustable tap on a potentiometer 61 connected between the output of amplifier 58 and line 33.

With this arrangement the voltage on line 36 is proportional to the voltage to which capacitor 55 has been charged.

OPERATION

In operation, a control reference input signal is delivered to input line 22a, resulting in an error signal to the SCR firing circuit 25a, causing an SCR to fire and conduct through the armature 16a and the load series impedance 30. Current will continue to flow through the fired SCR so long as its anode-to-cathode voltage is positive and above the holding value. So long as current is flowing through the armature circuit there will be a voltage drop across the impedance 30. If positive current is flowing downwardly, as viewed in FIG. 2, through the armature 16a and impedance 30, it will cause line 40 to be at a positive potential with respect to line 33. If the armature current is of the opposite polarity, it will cause line 40 to be negative with respect to line 33. When no armature current is flowing, there will be no voltage drop across impedance 30 and line 40 will be at the same potential as line 33.

With no armature current flowing, and therefore line 40 and line 33 at the same potential, the operational amplifier 44, which has a very high open loop gain, will be driven to positive saturation by the small negative bias 50 applied to its inverting input 43. FET 54 has a very low source-to-drain impedance when its gate-to-source voltage is zero or positive and it has a very high source-to-drain impedance when its gate-to-source voltage is sufficiently negative. Thus, when no armature current is flowing, FET 54 is conductive and acts substantially as a closed switch between its source and drain terminals. Diode 56 prevents gate current from flowing and giving an erroneous charge on capacitor 55.

If line 40 is sufficiently positive with respect to line 33, the negative bias 50 is overcome and the inverting input 43 of operational amplifier 44 becomes positive, thus driving the output of the operational amplifier to negative saturation. This negative output forward biases diode 56 and applies a negative bias on the gate of FET 54, causing FET 54 to become non-conductive and to act substantially like an open switch between its source and drain terminals. It should be noted that diodes 45 and 46 prevent the positive potential at line 40 from being applied to the non-inverting input 47 of operational amplifier 44.

If line 40 is sufficiently negative with respect to line 33, diodes 41, 42 will prevent this negative potential from being applied to the inverting input 43 of operational amplifier 44. However, diodes 45, 46 will cause this potential to be applied to the non-inverting input 47, thereby overcoming the negative bias 50 applied to the inverting input 43 and driving the output of operational amplifier 44 to negative saturation. As described above, this causes FET 54 to act like an open switch between its source and drain terminals.

By proper selection of the circuit parameters, FET 54 can be made to operate at extremely low levels of armature current, thus acting like a high speed switch to "open" when armature current of either polarity above a predetermined level is present and to "close" when armature current is below this predetermined level, which preferably is substantially zero.

Figure 4:
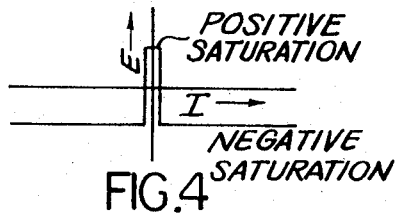
FIG. 4 is a plot of the output voltage of the operational amplifier versus the armature current in the FIG. 2 system.

As noted above, the forward voltage drop of the silicon diodes 37, 38 in impedance 30 is approximately 0.6 volt. The forward voltage drop of the series-connected germanium diodes 41, 42 or 45, 46 is approximately 0.4 volt. The present invention takes advantage of this fact in order to provide improved noise immunity. Thus, a 0.4 volt difference is required between line 40 and either input 43 or 47 of operational amplifier 44 in order for the voltage on line 40 to drive the output of operational amplifier 44 to negative saturation. Stated another way, the output of operational amplifier 44 will, because of the negative bias source 50, be at its positive saturation value at all times except when the voltage on line 40 is less than approximately ±0.4 volt. Conversely, when the voltage on line 40 is at least 0.4 volt positive or negative, the operational amplifier will be driven quickly to negative saturation. FIG. 4 shows the output voltage of operational amplifier 44 plotted against armature current I. The abrupt change from negative to positive saturation and vice versa is due to the action of diodes 41, 42 or 45, 46 and the very high gain of operational amplifier 44.

As noted earlier, FET 54 acts as a closed switch when its gate is unbiased or positively biased and as an open switch when its gate is sufficiently negatively biased. Thus, if the value of resistor 39 is, for example, 25 ohms, then the armature current must be less than approximately ±0.016 ampere before FET 54 will be gated into conduction, thus assuming that the driving voltage, the armature IR drop, brush IR drop and armature reactance contributions to the voltage appearing across voltage divider 52 are substantially zero when the CEMF is sampled.

The sample and hold velocity sensor of the present invention can be made to apply to any active, i.e., CEMF producing, load by proper selection of the impedance 30 and voltage dividers 52 and 61 to provide proper voltage levels for the storage capacitor 55 and the SCR firing circuit 25a. If bidirectional operation is desired, the negative saturation voltage of operational amplifier 44 must exceed the drain-to-source voltage plus the pinch voltage of FET 54.

When the sample and hold CEMF circuit of the present invention is used with a polyphase drive system, for example, a three-phase half-wave bidirectional drive system, a time delay circuit 70 is used, as shown in FIG. 2. The function of the time delay circuit 70 is to delay the start of a subsequent direct current pulse by inhibiting the firing of the SCR's so that a sufficient time interval of zero load current will occur during which a CEMF sample may be taken. In the preferred embodiment of the present invention, the firing of all the SCR's in circuit 11a is inhibited when load current, as detected by impedance 30 and operational amplifier 44 as described above, is substantially above zero. If when the load current becomes substantially zero, the next firing pulse would fire the next SCR in less than approximately 0.1 millisecond, the time delay circuit 70 acts to further inhibit firing until the load current has been substantially zero for approximately 0.1 millisecond. Thus, the intervals of zero load current are assured of being sufficiently long to provide a reliable sampling of the CEMF. It will, of course, be recognized by those skilled in the art that by changing the parameters of voltage divider 52 and capacitor 55, thus reducing the RC time constant for charging capacitor 55, a shorter sampling period could be provided. The 0.1 millisecond charging interval mentioned above has been found to be quite satisfactory for use on a three-phase half-wave SCR drive for a velocity servo system. The 0.1 millisecond interval is long enough to provide a charge on capacitor 55 that is substantially proportional to the CEMF during the interval, while being short enough that it does not impair system response as compared to an identical system using a tachometer to provide the velocity feedback signal.

It will be appreciated that in the system of FIG. 2, while the armature is rotating armature current will actually only instantaneously be zero when the driving current starts and stops. This is because even if SCRs acted as perfect switches, there would still exist a circuit through voltage divider 52 for armature current driven by the CEMF of motor 15a. However, if the resistance of voltage divider 52 is made several times larger than the armature resistance of motor 15a, the armature current which flows as a result of the CEMF when the SCR's are gated off may be made sufficiently small as to have negligible effect on the motor's dynamic response.

Figure 5:
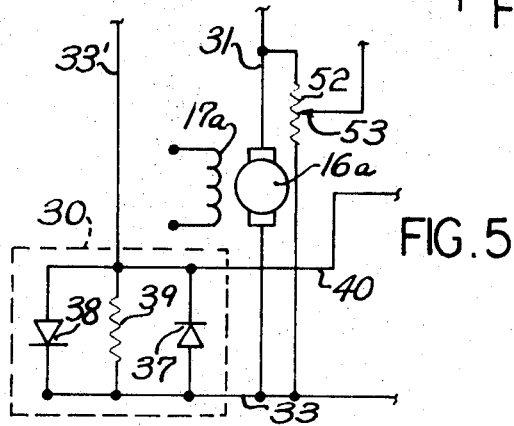
FIG. 5 is a fragmentary schematic diagram showing an alternate connection of the load series impedance in a system otherwise identical to that of FIG. 2.

It should also be noted that the location of impedance 30 in the armature circuit may be changed. For example, impedance 30 may be located as shown in FIG. 5, where the armature 16a is connected between lines 31 and 33 and impedance 30 is connected between line 33 and a line 33' which is in turn connected to the power gate 11a. In this arrangement, the polarity of the voltage on line 40 is reversed from that of FIG. 2, but this is immaterial because the response of operational amplifier 44 is the same for both positive and negative signals. In the arrangement of FIG. 5, however, voltage divider 52 may be connected directly across the armature rather than in series with impedance 30.

While a presently-preferred embodiment of this sample and hold velocity system has been described in detail with reference to the accompanying drawings, it is to be understood that various modifications, omissions and adaptations which depart from the disclosed embodiment may be adopted without departing from the spirit and scope of this invention. For example, although the use of diodes 42 and 46 in conjunction with diodes 41 and 45 improves the noise rejection of the current detecting portion of the circuit, they are not basic to the circuit's performance and may be omitted. Also, different diode materials, such as selenium, having other forward bias threshold voltages may be used for diodes 37, 38, 41, 42, 45 or 46.

Having described our invention, we claim:

1. For use with counter EMF-producing load energized by variable current source, a voltage sampling arrangement comprising: energy storage means, switch means for connecting said energy storage means to said load to charge said energy storage means to a value proportional to the voltage across said load when said switch means is conductive, and current sensing means for connection to said load and operative to sense whether the current therein is above or below a predetermined minimum value, said current sensing means being operatively connected to said switch means to render the latter non-conductive when the current in said load is above said predetermined value, whereby to disconnect said energy storage means from said load when the load is being energized by said source, said current sensing means permitting said switch means to be closed to connect said energy storage means to said load when the current in the load is below said predetermined value, whereby the energy storage means receives a charge proportional to the counter EMF of the load.

2. A voltage sampling arrangement according to claim 1, wherein said switch means is a semiconductor device, and said energy storage means comprises a capacitor connected to the output of said semiconductor device.

3. A voltage sampling arrangement according to claim 2, and further comprising high impedance means connected to said capacitor and operative to provide a long time delay in the latter's discharge when disconnected from said load.

4. A voltage sampling circuit according to claim 3, wherein said semiconductor device is a field effect transistor.

5. A voltage sampling arrangement according to claim 1, wherein said current sensing means comprises an operational amplifier having its output operatively connected to said switch means to control the latter's operation, and further comprising means for biasing said operational amplifier to a condition permitting said switch means to be conductive, and means responsive to current in said load above said predetermined value for overcoming said biasing means to cause said operational amplifier to produce an output signal of a polarity effective to render said switch means non-conductive.

6. A voltage sampling arrangement according to claim 5, wherein said last-mentioned means comprises diode means for connection to said load and having a predetermined forward breakdown voltage which is exceeded when the current in said load is above said predetermined value, said diode means being connected to the input of said operational amplifier to pass forward diode current thereto for overcoming said biasing means.

7. A voltage sampling arrangement according to claim 5, wherein said switch means is a semiconductor device, and said energy storage means comprises a capacitor connected to the output of said semiconductor device.

8. A voltage sampling arrangement according to claim 7, and further comprising high impedance means connected to said capacitor and operative to provide a long time delay in the latter's discharge when disconnected from said load.

9. A voltage sampling circuit according to claim 8, wherein said semiconductor device is a field effect transistor having a gate electrode connected to the output of said operational amplifier.

10. In a servo system for energizing a counter EMF-producing load, means for applying direct current pulses to said load, a circuit for providing a signal proportional to the counter EMF comprising storage means for storing a signal proportional to the counter EMF during a first period when the load current is substantially zero and for holding the stored signal during a subsequent second period when the load current is substantially above zero, switching means for effectively connecting the storage means to the load to enable the storage means to store said signal and for effectively disconnecting the storage means from the load, and detecting means for detecting load current and controlling the switching means to connect the storage means to the load during the first period and to disconnect the storage means from the load during the second period.

11. A servo system according to claim 10, and further comprising means for delaying the application of a subsequent direct current pulse to the load so that a predetermined minimum time interval of substantially zero load current will occur during which the storage means may store said signal.

12. A servo system according to claim 10, wherein the detecting means includes impedance means in series with the load for causing a voltage drop across said impedance means when load current is flowing, and a level detector connected to said impedance means and adapted to provide a control signal to said switching means when the voltage drop across said impedance is above a predetermined value.

13. A servo system according to claim 12, wherein said impedance means in series with the load includes a resistor and first and second diodes connected in parallel with each other across said resistor, the diodes being connected with opposite polarity.

14. In a motor control circuit having a power gate circuit for variably controlling the application of input energy to the motor, the improvement which comprises means for sampling the voltage across the motor, means responsive to motor current for disabling said sampling means when the motor current is substantially above zero so that sampling of the motor voltage can take place only when said voltage is due to the counter EMF of the motor, and means for controlling the timing of said power gate in response to the sampled voltage to regulate the motor speed.

15. A motor control circuit according to claim 14, wherein said sampling means comprises a capacitor for storing a voltage substantially proportional to the voltage across the motor, and normally closed switch means connecting said capacitor to the motor, and said means for disabling said sampling means comprises current sensing means connected to sense the motor current and operative to open said switch means when the motor current is substantially above zero.

16. A motor control circuit according to claim 15, wherein said switch means is a semiconductor device.

17. A motor control circuit according to claim 16, wherein said semiconductor device is a field effect transistor.

18. A motor control circuit according to claim 16, wherein said current sensing means comprises an operational amplifier having its output operatively connected to said semiconductor device to control the latter's operation, and further comprising means for biasing said operational amplifier to a condition permitting said semiconductor device to be conductive, and means responsive to the motor current for overcoming said biasing means to cause said operational amplifier to produce an output signal of a polarity effective to render said semiconductor device non-conductive.

19. A motor control circuit according to claim 18, and further comprising high impedance means connected to said capacitor and operative to provide a long time delay in the latter's discharge when disconnected from the motor by said semiconductor device.

References Cited

UNITED STATES PATENTS

| | | | |
|---|---|---|---|
| 2,905,876 | 9/1959 | Hillman | 318—331 |
| 3,411,062 | 11/1968 | Kamens | 318—331 |
| 3,436,635 | 4/1969 | James | 318—345 |
| 3,466,521 | 9/1969 | Lagier | 318—341 |

ORIS L. RADER, Primary Examiner

T. LANGER, Assistant Examiner